United States Patent [19]
Saeki et al.

[11] Patent Number: 5,458,831
[45] Date of Patent: Oct. 17, 1995

[54] METHOD FOR MANUFACTURING A FIBER REINFORCED FOAM RESIN USING ADJUSTABLE ENDLESS BELTS

[75] Inventors: Noriyasu Saeki; Koichi Watanabe, both of Osaka; Hideo Iwai, Shiga; Eiichi Yasuda, Shiga; Ryuji Inoue, Shiga, all of Japan

[73] Assignee: Sekisui Kagaku Kogyo Kabushiki Kaisha, Osaka, Japan

[21] Appl. No.: 254,008

[22] Filed: Jun. 3, 1994

Related U.S. Application Data

[62] Division of Ser. No. 946,837, Sep. 21, 1992, Pat. No. 5,340,300.

[30] Foreign Application Priority Data

Sep. 21, 1991 [JP] Japan .................................. 3-242162

[51] Int. Cl.⁶ .................................................... B29C 44/28
[52] U.S. Cl. ........................ 264/46.2; 264/45.8; 264/46.4
[58] Field of Search ................................ 264/45.3, 46.2, 264/45.8, 46.3, 46.4; 425/4 C

[56] References Cited

U.S. PATENT DOCUMENTS

| | | | |
|---|---|---|---|
| 529,535 | 11/1894 | Smith | 425/329 |
| 2,817,875 | 12/1957 | Harris et al. | 425/115 |
| 3,050,427 | 8/1962 | Slayter et al. | 264/45.3 |
| 3,462,795 | 8/1969 | Hermanns | 425/115 |
| 3,487,143 | 12/1969 | Bergvall | 425/115 |
| 3,824,057 | 7/1974 | Kornylak et al. | 264/46.2 |
| 3,914,084 | 10/1975 | Kornylak | 425/329 |
| 3,914,085 | 10/1975 | Kruelskie | 425/817 C |
| 4,025,257 | 5/1977 | Sagane et al. | 425/115 |
| 4,051,208 | 9/1977 | Jaccard | 425/329 |
| 4,179,540 | 12/1979 | Smarook | 264/45.3 |
| 4,504,429 | 3/1985 | Griffiths | 264/46.2 |
| 4,600,637 | 7/1986 | Kafka et al. | 264/45.3 |
| 5,089,189 | 2/1992 | Staneluis et al. | 264/45.3 |
| 5,340,300 | 8/1994 | Saeki et al. | 425/329 |

FOREIGN PATENT DOCUMENTS

| | | | |
|---|---|---|---|
| 2729219 | 1/1979 | Germany. | |
| 3341438 | 6/1985 | Germany. | |
| 52-2421 | 1/1977 | Japan. | |
| 53-85860 | 7/1978 | Japan | 264/45.3 |
| 599270 | 5/1978 | Switzerland | 264/45.3 |

*Primary Examiner*—Allan R. Kuhns
*Attorney, Agent, or Firm*—Edwin E. Greigg; Ronald E. Greigg

[57] ABSTRACT

A formed piece continuous manufacturing apparatus formed by four endless belts for carrying out a method utilizing such apparatus. At least three of the endless belts are movably supported by a movable device, and the sectional shape of the forming passage is freely controlled by arbitrarily moving at least three endless belts. A method of forming a fiber reinforced foam resin article using the apparatus is described.

1 Claim, 14 Drawing Sheets

METHOD FOR MANUFACTURING A FIBER REINFORCED FOAM RESIN USING ADJUSTABLE ENDLESS BELTS

This is a divisional of copending application(s) Ser. No. 07/946,837 filed on Sep. 21, 1992 now U.S. Pat. No. 5,340,300.

BACKGROUND OF THE INVENTION

The present invention relates to a method continuous manufacturing of a fiber reinforced foamed resin formed piece used in various applications including sleepers and building materials, or similar formed pieces.

Figure 17:
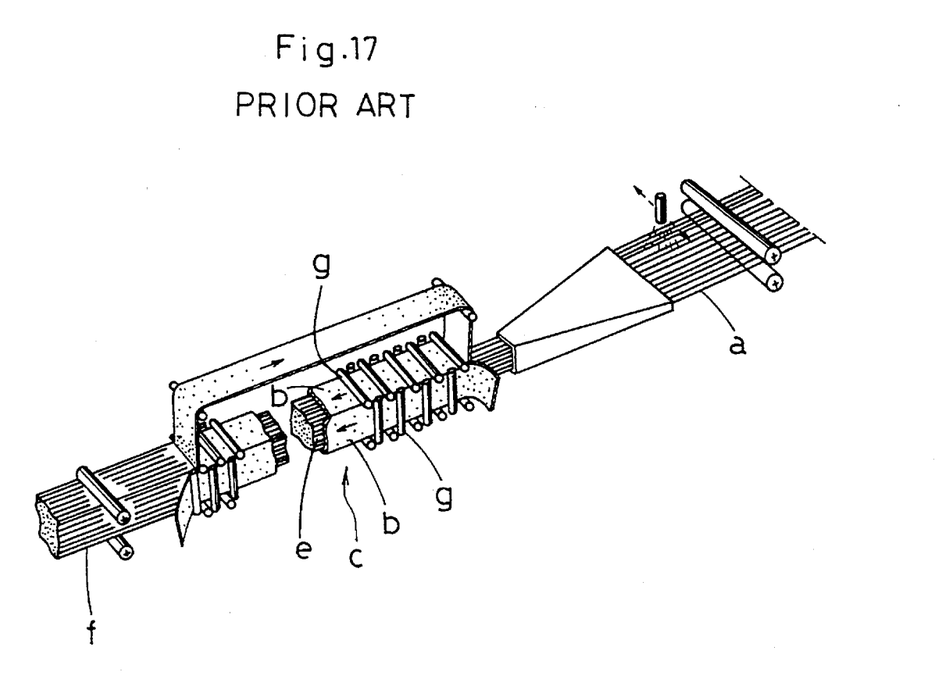
FIG. 17 is a partially cut-away perspective view showing a conventional example.
Figure 18:
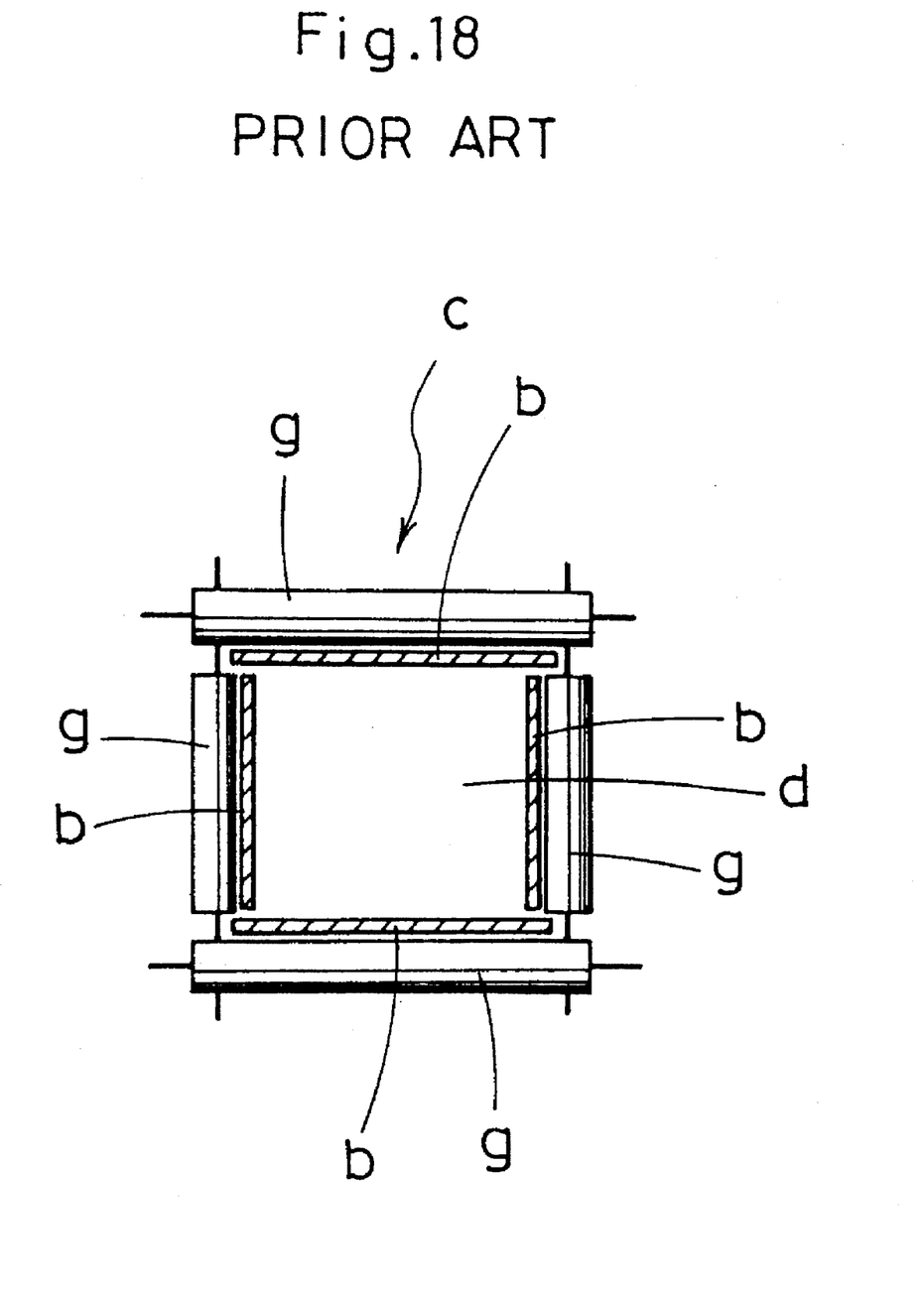
FIG. 18 is a cross-sectional view showing the configuration of endless belts and rollers in a conventional method.

As a continuous manufacturing method of a foamed piece reinforced with long fibers, generally, a manufacturing method as disclosed, for example, in the Japanese Patent Publication Sho. 52-2421 is known. In this manufacturing method, as shown in FIG. 17 and FIG. 18, multiple long fibers a are arranged parallel and moved continuously, and a foam-curing resin solution is sprayed on the way to the long fibers a to impregnate the foamed resin. Next, the long fibers a impregnated with the foam-curing resin solution are led into a forming passage d of formed piece c shaped in a square cross section by four endless belts b. A bundle e of the long fibers impregnated with the foam-curing resin solution is foamed and cured while passing through this forming passage d. As a result, a long foam formed piece f in a square cross section is manufactured continuously.

In the manufacturing method disclosed in the Japanese Patent Publication Sho. 52-2421, the foam formed piece f is manufactured in such a process. With the forming die c used in this manufacturing method, since the four endless belts b for composing the forming passage d are of fixed type, to change the cross sectional shape of the foam formed piece f (to change the cross sectional slender ratio), it was necessary to disassemble the constituent members including the upper, lower, right and left rollers g of the forming passage d and endless belts b, exchange the constituent members so as to compose a desired shape of the foam formed piece, and reassemble the forming passage, which was a great demerit.

Figure 19:
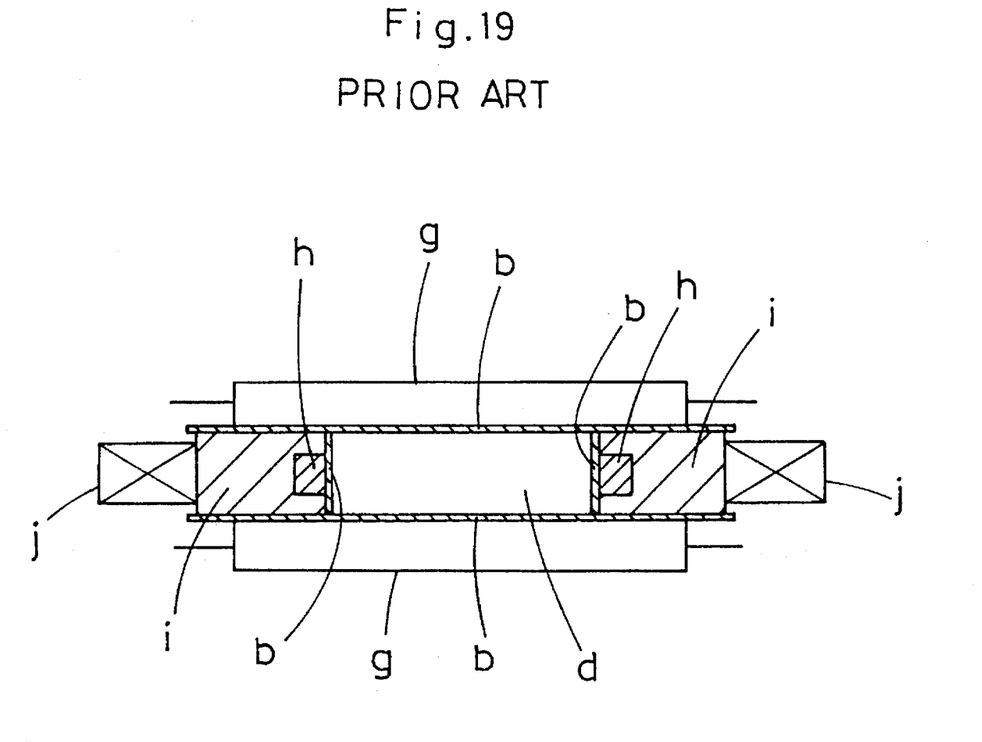
FIG. 19 is a sectional View showing an example of a conventional forming passage.

To solve this problem, for example, a manufacturing method as disclosed in the Japanese Utility Model Publication Sho. 59-36415 was developed. In this method, essentially, as shown in FIG. 19, four endless belts b are disposed in a mutually confronting manner at specific intervals so as to compose upper, lower, right and left sides, and a forming passage d of a square cross section is constructed. The endless belts b for composing the upper and lower sides of the forming passage d are defined in the movement in the upper direction and lower direction by rollers g disposed along the longitudinal direction of the forming passage d, so that the interval of the upper side and lower side of the forming passage d is always fixed at a specific gap.

On the other hand, the right and left sides of the forming passage d composed of the endless belts b are laid out so as to be held between the endless belts b composing the upper side and lower side. On the back side of the endless belts b (made of steel) for the right and left sides, a side frame i having a permanent magnet h, and a bearing j for supporting the side frame i are disposed so that the both endless belts b may not collapse into the passage d in the manufacturing process of the foam formed piece.

The essential parts of the manufacturing apparatus for carrying out the method disclosed in the Japanese Utility Model Publication Sho. 59-36415 are composed as described above. However, in this apparatus, the dimension in the widthwise direction of the foam formed piece to be formed can be freely changed by moving the endless belts b forming the both side surfaces, but the interval for forming the thicknesswise direction of the foam formed piece is constant-in its structure, and therefore when changing, it was necessary to disassemble the endless belts b of both sides, replace the right and left sides with endless belts of desired width, and reassemble the forming passage d.

Such modification required many parts to be changed, and took much manpower in replacement and adjustment, and needed a long working time. Furthermore, the facility expense was enormous, and a wide storing space for replacement parts was needed, among other problems.

The invention was developed in the light of such background, and it is hence a primary object thereof to present a continuous manufacturing method of formed piece capable of changing the size of the cross section of the forming passage by a simple operation, forming a formed piece of a desired sectional shape easily and efficiently, and preventing leak of resin solution from the forming passage, and its apparatus.

SUMMARY OF THE INVENTION

To achieve the above object, the invention is composed as follows. That is, the invention presents a formed piece continuous manufacturing apparatus for carrying out the method characterized by disposing four endless belts parallel, filling a forming passage enclosed and formed by these four endless belts with material, and forming the material continuously in a slender formed piece along with the progress of the endless belts, wherein one end of each endless belt in the longitudinal direction slidably abuts against the specified inner surface of each endless belt, at least three endless belts are movably supported by each movable means, and the sectional shape of the forming passage is freely controlled by arbitrarily moving at least three endless belts.

In the formed piece continuous manufacturing apparatus, one of the four endless belts composing the forming passage is fixed, the other three endless belts are provided with movable means, and these three endless belts are arbitrarily moved by the moving means, thereby composing the forming passage in a desired sectional shape.

In the formed piece continuous manufacturing apparatus, moreover, the lower side endless belt is fixed, among the four endless belts for composing the forming passage, and the upper side and right side and left side endless belts are provided with movable means so as to be mobile, and by each moving means, the upper side endless belt can be moved in the vertical and lateral directions, one lateral side endless belt having one end in the longitudinal direction contacting with the inner surface of the lower side endless belt can be moved in the lateral direction, while the other lateral side endless belt can be moved in the vertical direction, thereby composing arbitrarily the forming passage in a desired sectional shape.

Further, in the formed piece continuous manufacturing apparatus, a belt constraining jig is disposed at the end of each endless belt not contacting with the other endless belts, so that each endless belt may be pressed against the other contacting endless belt side.

Besides, at the inner side of the forming passage composed by the four endless belts, a sealing member is disposed along the longitudinal direction, at one end of each endless belt disposed movable on the inner surface of the other endless belts.

Or, at the inner side of the forming passage composed by the four endless belts, along the longitudinal direction of the one end of each endless belt disposed slidably on the inner surface of the other endless belts, a thread piece feeding device is installed so as to feed a thread piece for sealing the gap between the end of the endless belt and the upper side of the other endless belts.

The invention relates to a continuous manufacturing method of fiber reinforced foam resin formed piece, using the forced piece continuous manufacturing apparatus wherein the forming passage is filled with a reinforcing material impregnated with a foam-curing resin solution, and the foam-curing resin solution is foamed and cured in the running process of the endless belts, thereby manufacturing a slender formed piece in a desired sectional shape.

In such constitution, by moving the endless belts by manipulating each movable means so as to compose a desired sectional shape, for example, a sectional shape with desired vertical and lateral dimensions in a sectional shape of rectangle, square or the like, the sectional shape (vertical and lateral dimensions) of the forming section composed by the four endless belts can be set, and by continuously passing the reinforcing material impregnated with a foam-curing resin solution in this forming passage, and foaming and curing the foam-curing resin solution in this process, a slender formed piece of a desired sectional shape can be manufactured by simple moving manipulation of the endless belts.

Still more, by putting a sealing member in the gap at the end portion of each endless belt for composing the forming passage, when the forming passage is filled with material such as foam-curing resin solution, a foam pressure of 3 to 5 kg/cm is applied to the inner surface of the forming passage at the time of foaming, and the sealing member is pressed to stop the gap between endless belts, thereby preventing running of a burr.

When the thread form feeding device is installed, moreover, by the foaming pressure of the material such as foam-curing resin solution filling up the forming passage for continuously manufacturing slender formed pieces, the thread piece supplied from the thread piece feeding device is pressed against the gap of endless belts to seal the gap, thereby preventing running of burr.

DETAILED DESCRIPTION OF THE PREFERRED EMBODIMENTS

Referring now to FIG. 1 through FIG. 16, some of the preferred embodiments of the invention are described in detail below.

As shown in FIG. 1 through FIG. 5, numeral 1 denotes a continuous manufacturing apparatus for carrying out a method of forming a fiber reinforced foam resin formed piece in an embodiment of the invention, and 2, 3, 4, 5 are four endless belts for composing a forming passage 6 for continuously passing a reinforcing material impregnated with foam-curing resin solution, foaming and curing the foam-curing resin solution in this process, and forming a desired fiber reinforced foam resin formed piece (hereinafter called a slender formed piece). The upper surface, lower surface, and both side surfaces of the forming passage 6 are composed by these endless belts 2, 3, 4, 5, and the endless belts 2, 3, 4, 5 on the upper surface, lower surface, and side surfaces of the forming passages 6 are disposed parallel to each other.

The endless belts 2, 3, 4, 5 are disposed, as shown in FIG. 2 and FIGS. 9 to 12, so that one end of each endless belt in the longitudinal direction may abut against the top surface of a specified endless belt slidably with a proper pressure, thereby preventing the burr from running out from the contacting surface of the end of each belt and top of the other belts when foaming and forming.

More specifically, one end 2a in the longitudinal direction of the endless belt 2 in the upper surface is disposed so as to contact slidably with the inner surface 5b of the right side endless belt 5, one end ha in the longitudinal direction of the left side endless belt 4, with the inner surface 2b of the upper surface endless belt 2, one end 3a in the longitudinal direction of the lower surface endless belt 3, with the inner surface 4b of the left side endless belt 4, and one end 5a in the longitudinal direction of the right side endless belt 5, with the upper surface 3b of the lower surface endless belt 3.

Furthermore, the upper surface endless belt 2 is movable vertically and laterally by movable means described below, and the left side endless belt 4 is movable in the vertical direction. The right side endless belt 5 is movable in the lateral direction. The lower surface endless belt 3 is fixed at a specified position.

At the other ends 2c, 3c, 4c, 5c of the endless belts 2, 3, 4, 5, constraining jigs 7 composed of air cylinders and others are disposed individually. By the expanding and contracting action of the rod 7a of the contraining jig 7, a pressure member 7b attached to the front end of the rod 7a abuts against the end parts of the endless belts 2, 3, 4, 5 to press the endless belts 2, 3, 4, 5 to the abutting endless belt side with a proper pressure, thereby preventing the burr from running out from the abutting portions.

Figure 1:
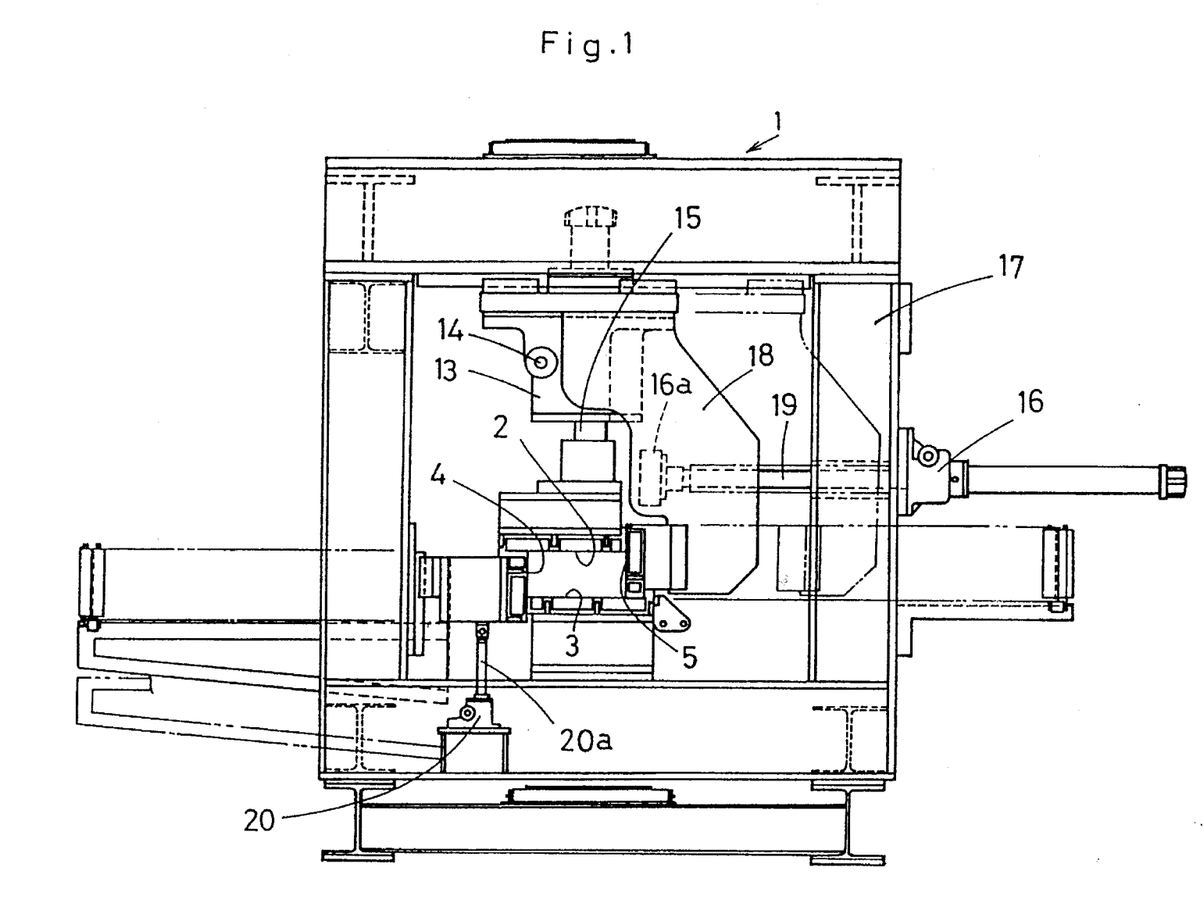
FIG. 1 is a side view of essential parts in an embodiment of the invention.
Figure 2:
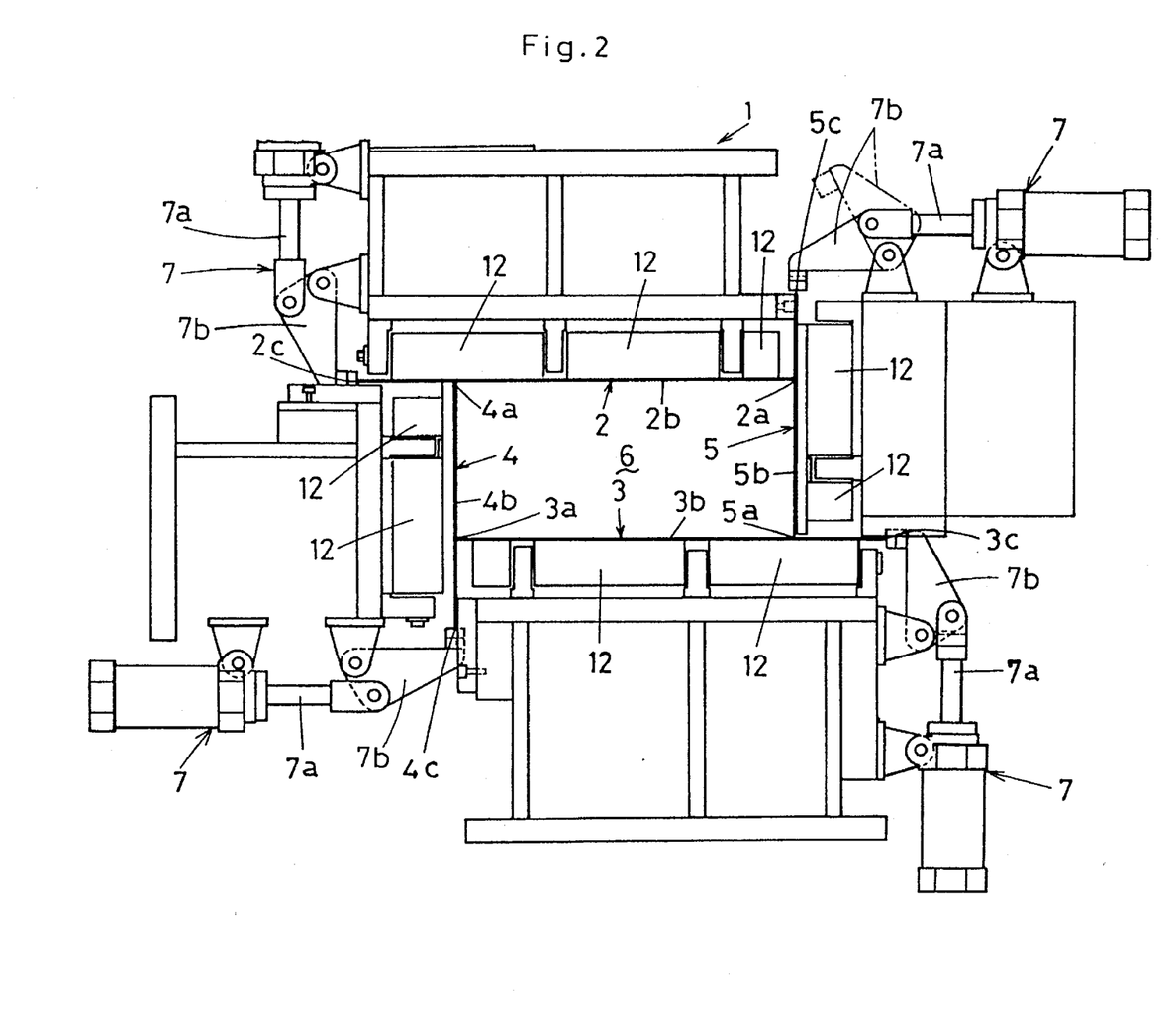
FIG. 2 is a side view of essential parts in an embodiment of the invention.
Figure 3:
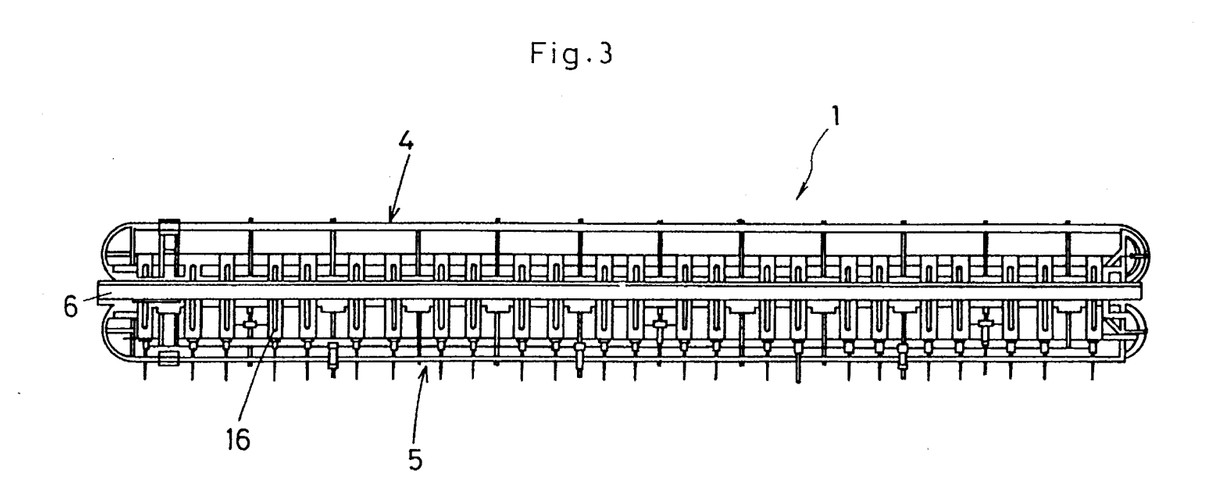
FIG. 3 is a plan view showing the endless belt parts on both side surface of the apparatus in the embodiment of the invention.
Figure 4:
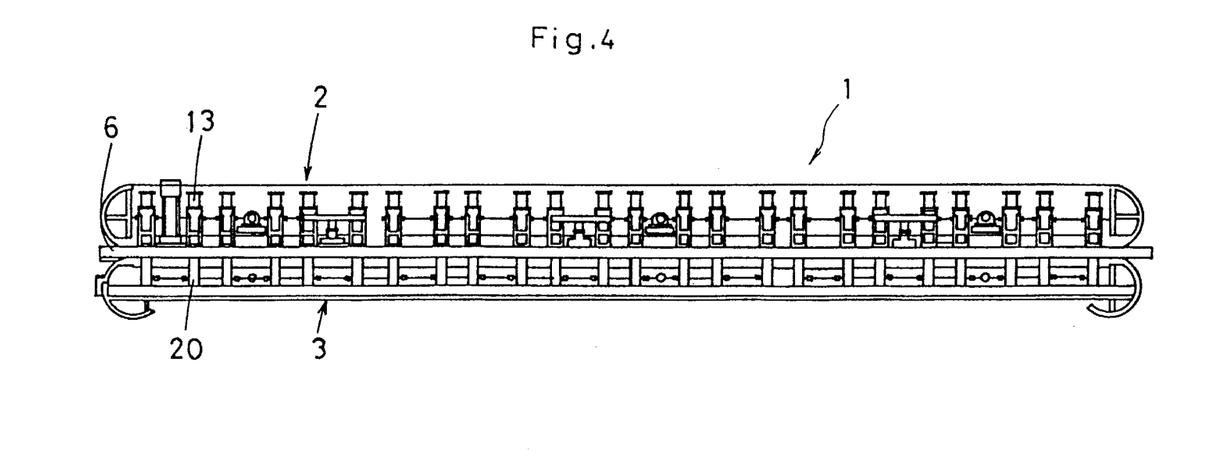
FIG. 4 is a front view showing the endless belt parts on the upper and lower surfaces of the apparatus in the embodiment of the invention.
Figure 5:
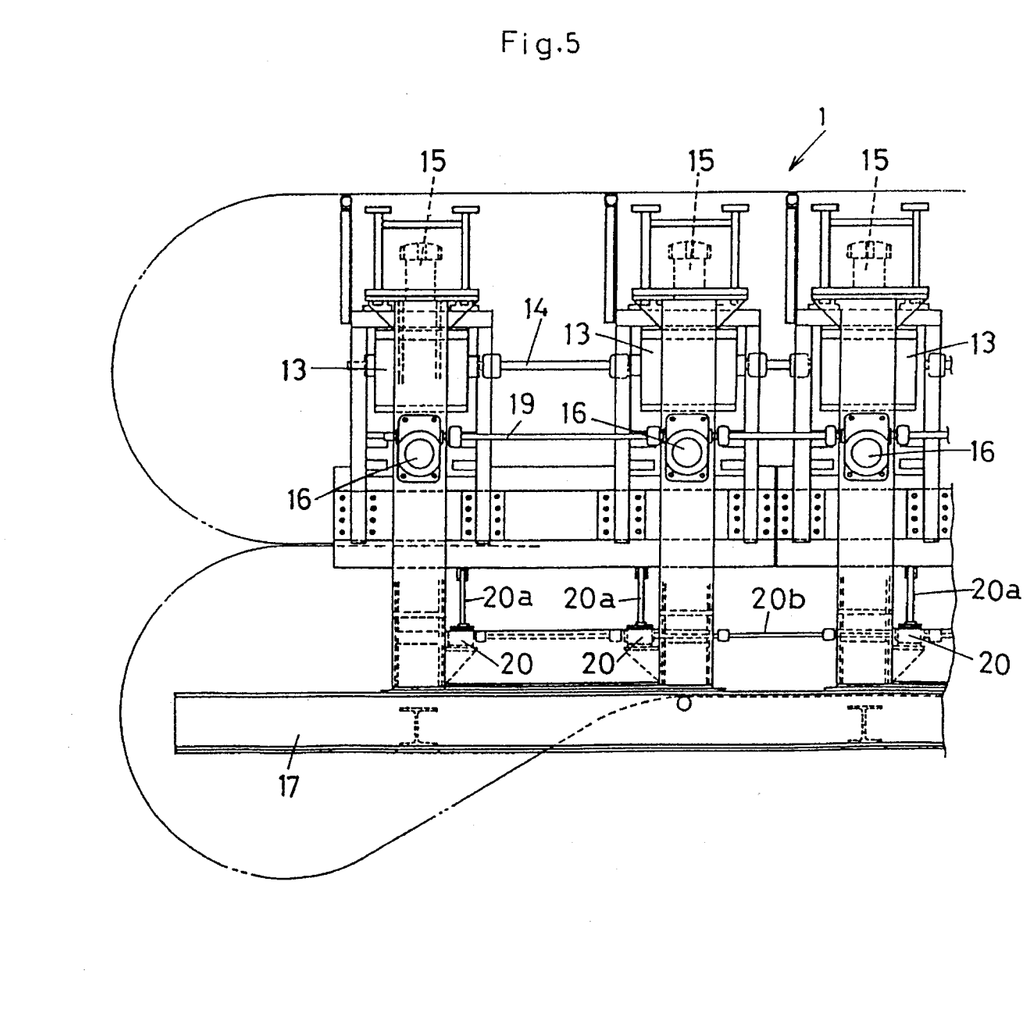
FIG. 5 is a partial front view showing the endless belt parts on the upper and lower surfaces of the apparatus in the embodiment of the invention.
Figure 6:
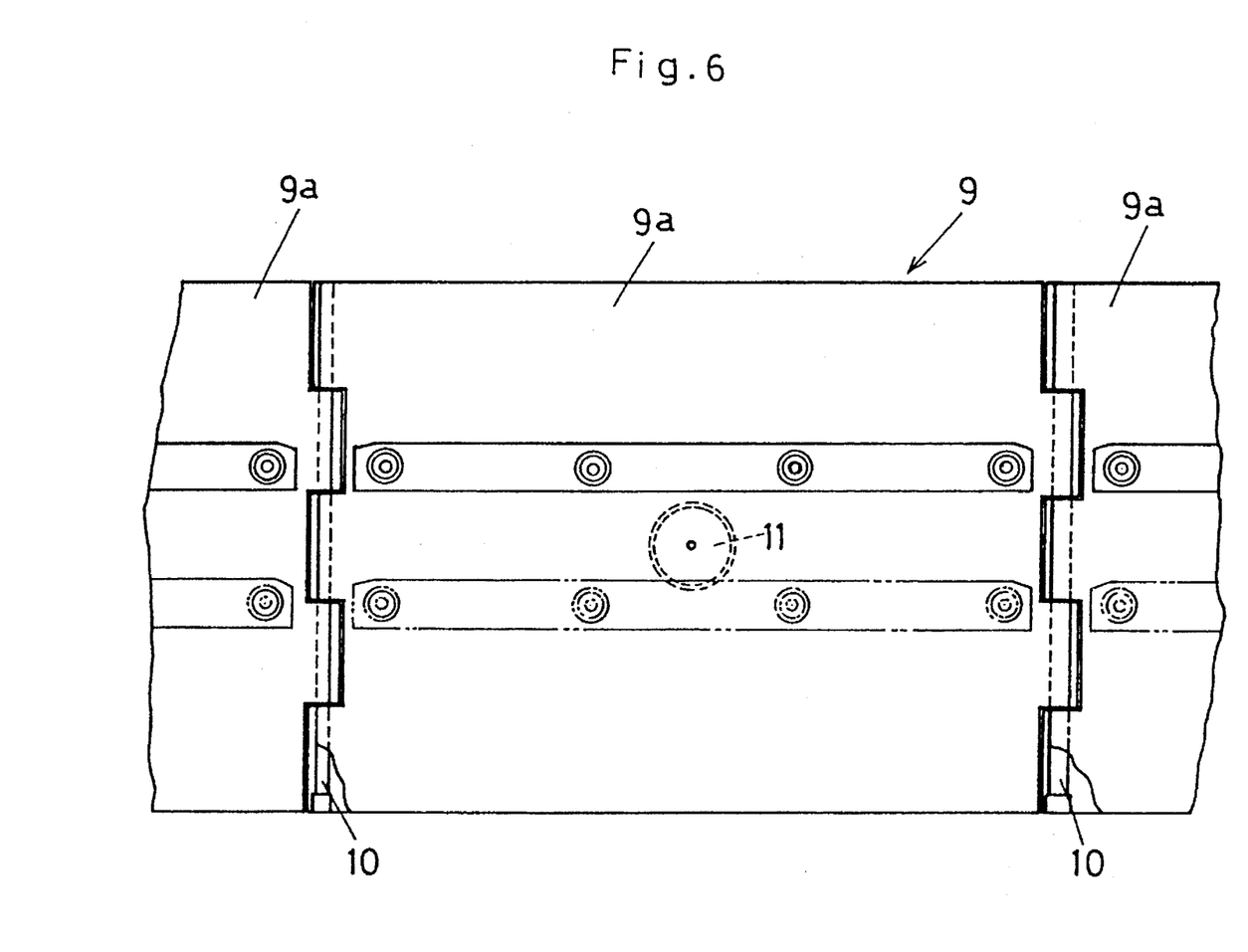
FIG. 6 is a partial plan view of a slat chain in the embodiment of the invention.
Figure 7:
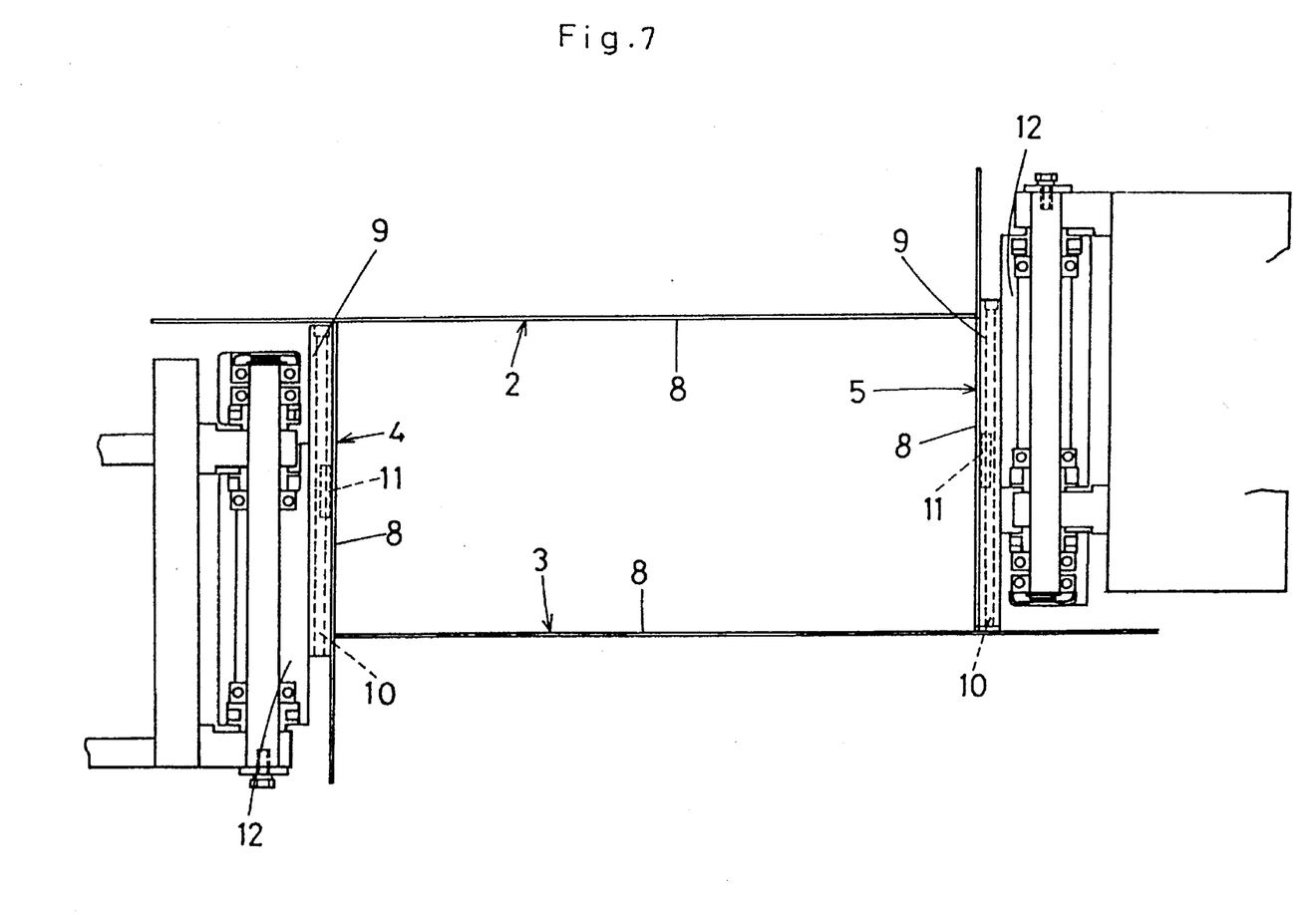
FIG. 7 is a structural explanatory diagram of junction parts of endless belts in the embodiment of the invention.
Figure 8:
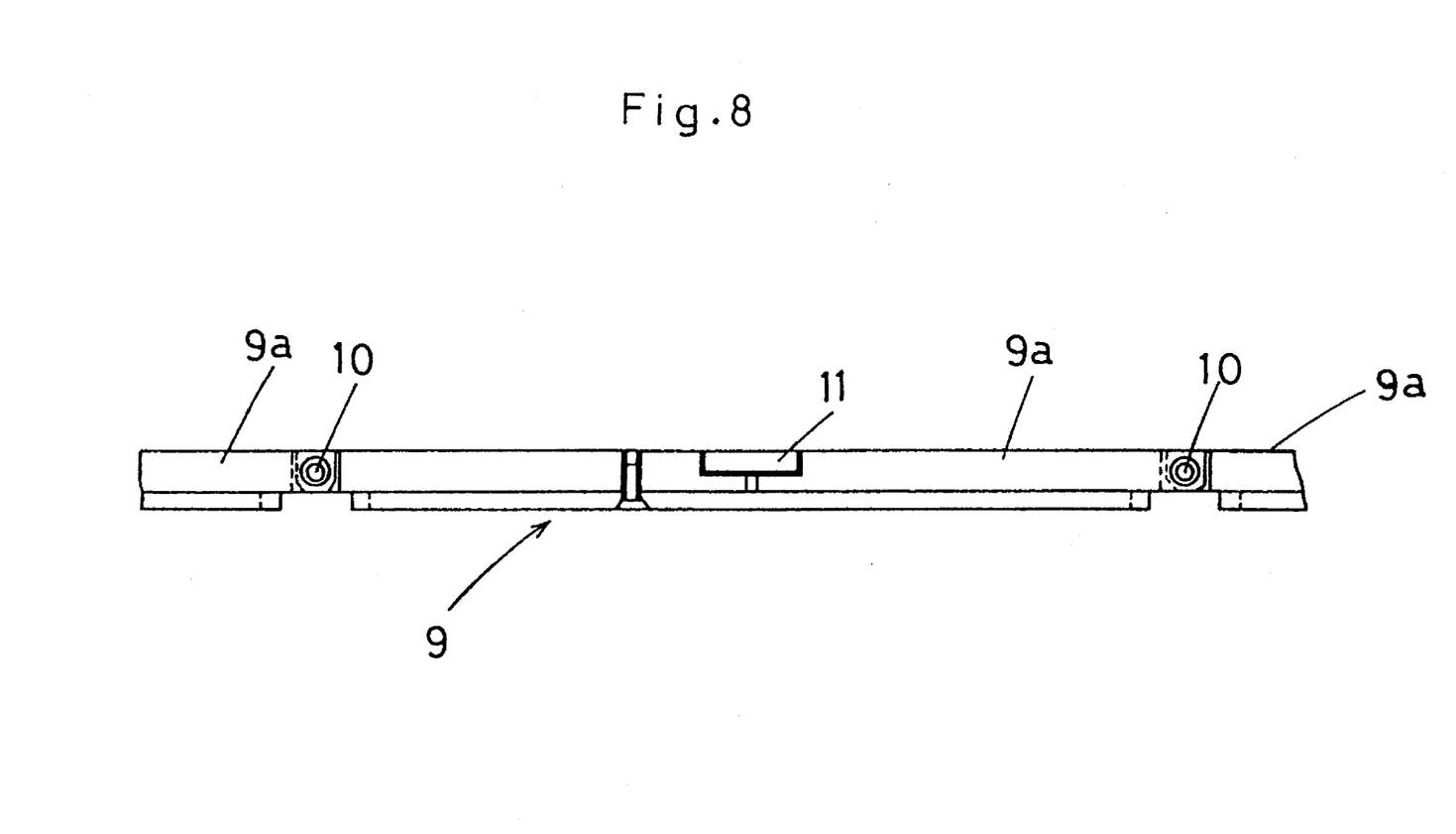
FIG. 8 is a partial front view of a slat chain in the embodiment of the invention.
Figure 9:
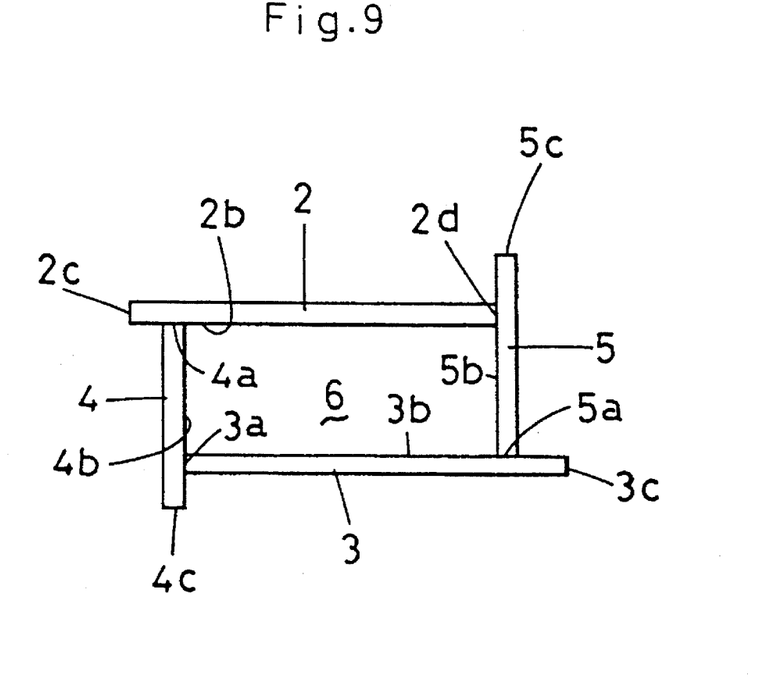
FIG. 9 to 12 are explanatory diagrams showing the junction parts of endless belts in the embodiment of the invention.
Figure 10:
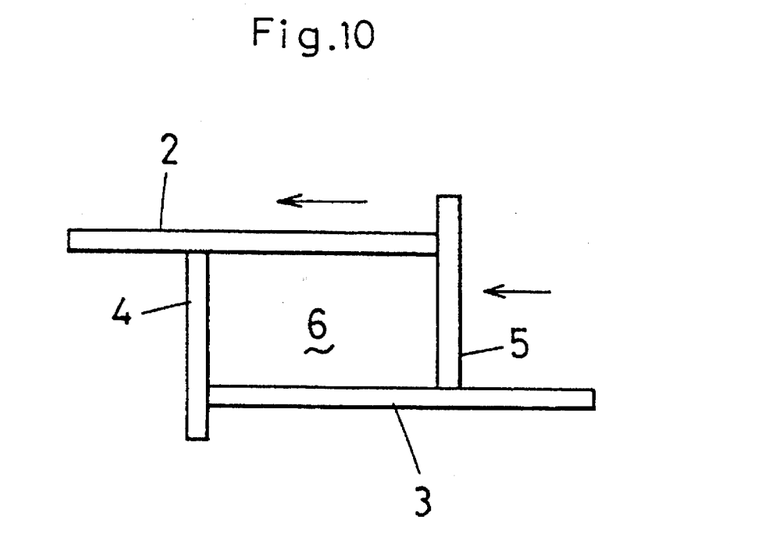
Figure 11:
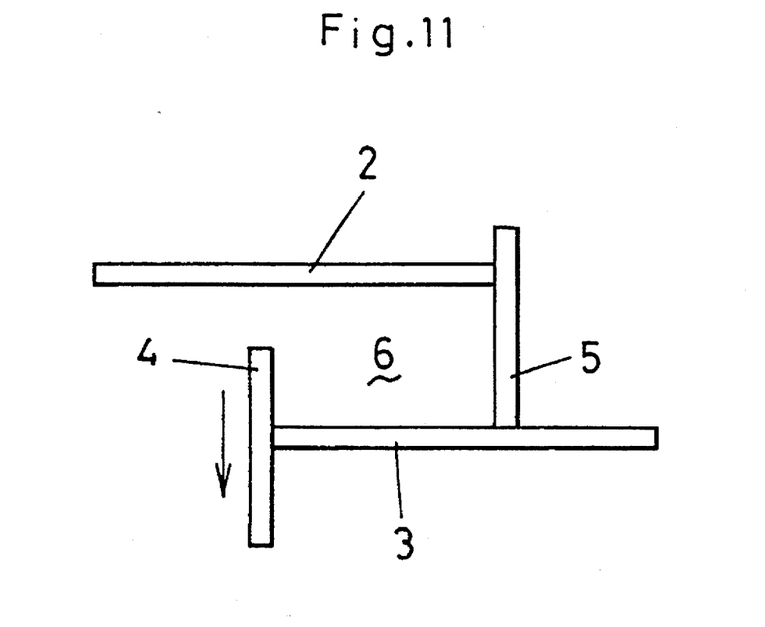
Figure 12:
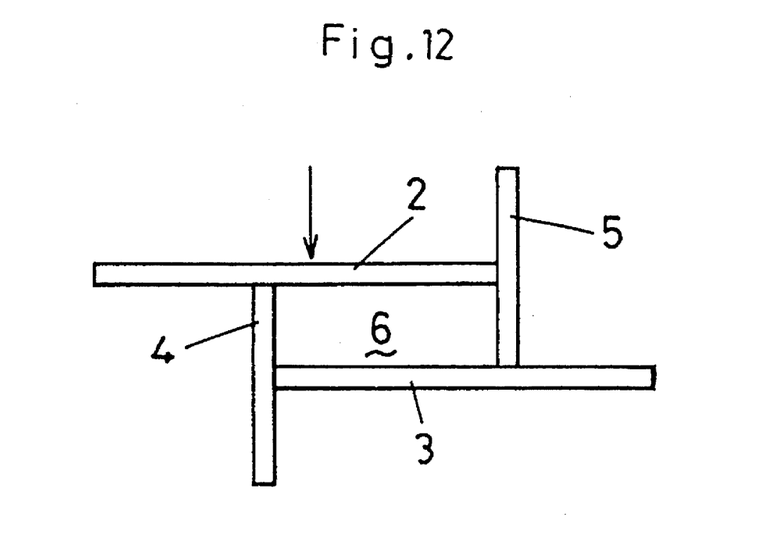

Of the endless belts 2, 3, 4, 5, as shown in FIGS. 6 to 8, the outer surface is formed of steel belt 8, and a slat chain 9 is disposed along the steel belt 8. The slat chain 9 is formed like a caterpillar, that is, slats 9a of about 200 to 300 millimeters are engaged end to end mutually formed in undulations, and are coupled by a coupling shaft 10, and formed endlessly.

In the middle of each slat 9a, a round magnet 11 is buried, and by this magnet 11, the steel belt 8 disposed outside of the slat chain 8 is attracted by the magnetic force. It prevents the steel belt 8 of the upper surface endless belt 2, for example, from drooping down by its own gravity while the forming passage 6 is not filled up with slender formed pieces. Incidentally, this magnet 11 may be installed either only on the slat chain 9 of the upper surface endless belt 2, or also on the slat chains 9 of the other endless belts 3, 4, 5.

In this way, by installing slat chains 9 along the steel belt 8, the steel belt 8 is protected in its strength, and, at the same time, the foam-curing resin solution leaking out from the steel belt 8 is prevented from invading further into the apparatus at the lower position. The slat chains 9 of the endless belts 2, 3, 4, 5 are supported by rollers 12 which are rotatably pivoted at specific intervals, and the steel belt 8 is designed to be free to rotate in the longitudinal direction through slat chains 9.

Of the endless belts 2, 3, 4, 5, the movable upper surface and both side endless belts 2, 4, 5 are provided with movable means. That is, the upper surface endless belt 2 is movable in the vertical and lateral directions as mentioned above, and multiple jacks 13 are disposed at specific intervals in the longitudinal direction of the endless belt 2 as movable means. Each jack 13 is engaged with a vertical shaft 15 of the jack 13 through a threaded shaft 14, and by rotating the threaded shaft 14 of the jack 13 at the end part, the vertical shaft 15 of the jacks 13 arranged in a row is moved up and down, and the part of the steel belt 8 for composing the upper surface of the forming passage 6 is moved up and down by this motion, so that the vertical (height) dimension of the forming passage 6 may be changed.

As the movable means for moving the upper surface endless belt 2 in the lateral direction, multiple jacks 16 are laid on a support frame 17 in a lateral row at specified intervals. At the rod end 16a of the jack 16, a pushing member 18 slidably erected on the support frame 17 is disposed. By rotating a threaded shaft 19 part of the jack 16, the rod end 16a can be moved in the lateral direction. As a result, the upper surface endless belt 2 can be moved in the lateral direction, while the right side endless belt 5 is simultaneously moved in the lateral direction. In this way, the lateral dimension of the sectional shape of the forming passage 6 can be changed.

Furthermore, as the moving means for moving the left side endless belt 4 in the vertical direction, multiple jacks 20 are disposed on the support frame 17 in a row at specified intervals, and by rotating one end of a threaded shaft 20b of the jack 20 located at the end of each jack 20, the rod 20a of the interlocked jacks 20 are expanded or contracted in the vertical direction, so that the endless belt 4 can be moved in the vertical direction. By this motion, the vertical (height) dimension of the forming passage 6 can be changed together with the vertical motion of the upper surface endless belt 2.

In thus composed continuous manufacturing apparatus 1 of slender formed pieces, when changing the size of the section of the slender formed pieces, the movable means for moving the endless belts 2, 4, 5 are manipulated to move, for example as shown in FIGS. 9 to 12, the endless belts 2, 4, 5 vertically and laterally, and the forming passage 6 of desired sectional shape (size) is formed (set), and the reinforcing material impregnated with foam-curing resin solution is continuously passed in this forming passage 6, and the foam-curing resin solution is foamed and cured in this process, and a desired slender formed piece is composed.

Besides, a take-up machine for taking up the slender formed pieces is disposed at the rear end of the apparatus of the invention. By taking up the slender formed piece by this take-up machine, the endless belts 2, 3, 4, 5 are rotated along with the movement of the slender formed piece. (Since the slender formed piece is a foamed piece, the endless belts 2, 3, 4, 5 are pressed, and when the slender formed piece moves, the endless belts 2, 3, 4, 5 rotate and move in harmony.)

When making a slender formed piece again in a different sectional shape (size), as mentioned above, the movable means of the endless belts 2, 4, 5 are first manipulated to move the endless belts 2, 4, 5 to compose (set) a forming passage 6 in a desired shape and size, and the reinforcing material impregnated in foam-curing resin solution is continuously passed in this forming passage 6, and a desired slender formed piece is obtained.

Figure 13:
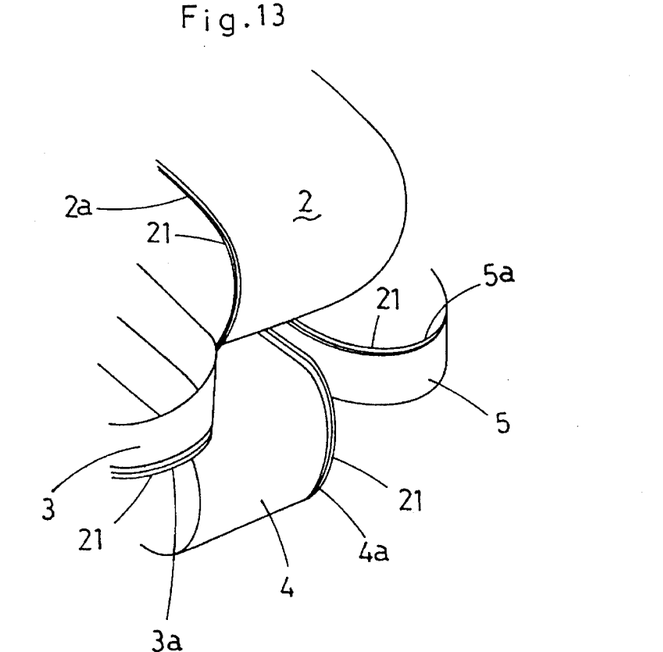
FIG. 13 is an explanatory diagram of essential parts in other embodiment of the invention.
Figure 14:
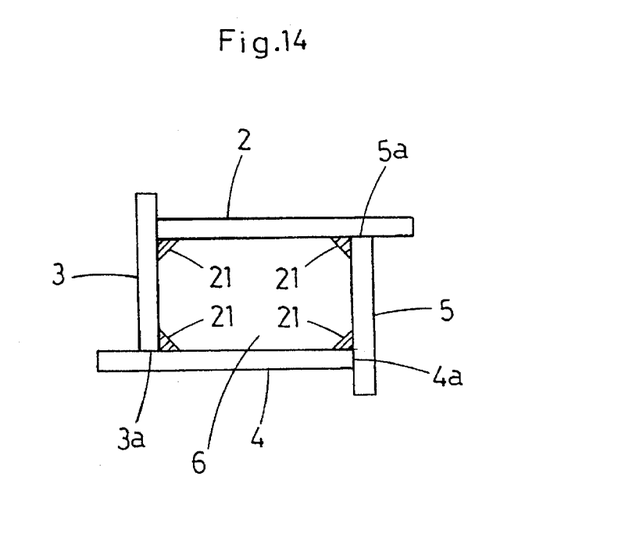
FIG. 14 is a schematic perspective view of other embodiment of the invention.

FIG. 13 and FIG. 14 relate to another embodiment, in which sealing members 21 are disposed along the longitudinal direction at the ends 2a, 3a, 4a, 5a of the endless belts 2, 3, 4, 5 disposed movably inside the other endless belts 3, 4, 5, 2, at the inner side of the forming passage 6 formed by the four endless belts 2, 3, 4, 5. The sealing members 21 are square posts of a triangular cross section, and are preferably made of silicone rubber considering the parting property.

In the forming passage 6 composed by the endless belts 2, 3, 4, 5 provided with sealing members 21, when the material such as foam-curing resin solution for manufacturing formed pieces such as sleepers is charged, the sealing members 21 are pressed against the upper surfaces of the other endless belts 3, 4, 5, 2 by the foaming pressure of the foam-curing resin solution to seal up the gaps of the endless belts. As a result, it is effective to prevent the burr from running out of the forming passage 6 from the gaps of the endless belts.

Figure 15:
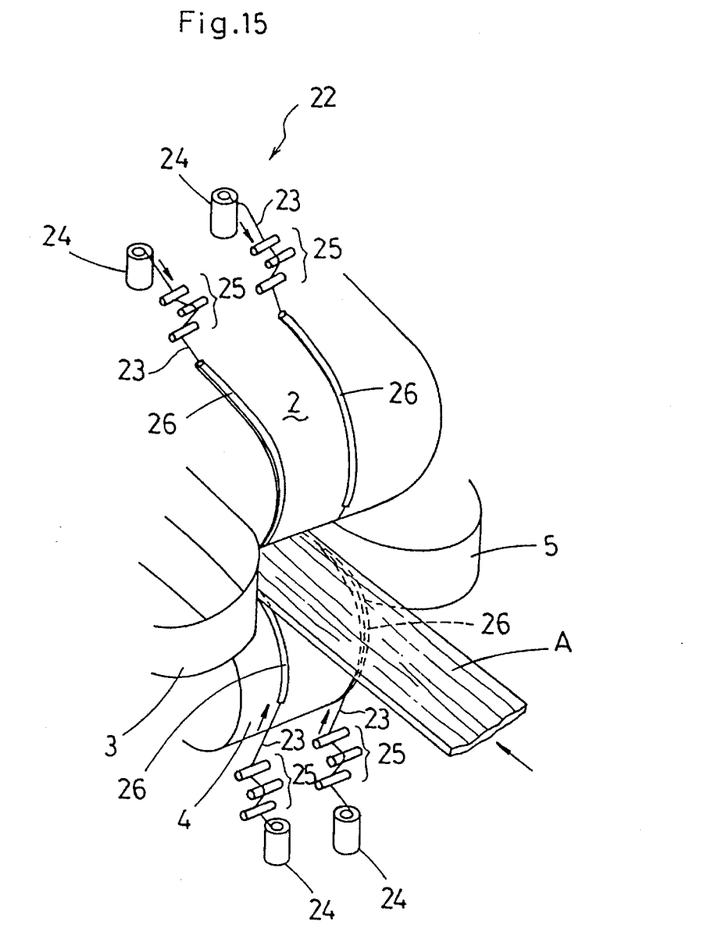
FIG. 15 is an explanatory diagram of essential parts in another embodiment of the invention.
Figure 16:
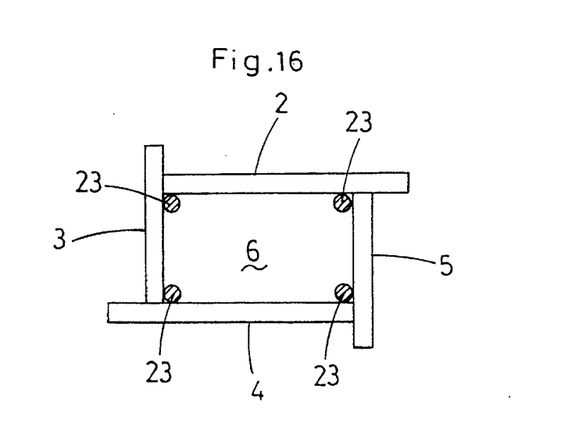
FIG. 16 is a sectional explanatory diagram of thread piece in forming passage in another embodiment of the invention.

FIG. 15 and FIG. 16 relate to another embodiment, in which a thread piece feeding device 22 is provided in the formed piece continuous manufacturing apparatus 1. This thread piece feeding device 22 is intended to supply a thread piece 23 along the longitudinal direction of the forming passage 6 at four corners of the forming passage crossing orthogonally between the endless belts 2, 3, 4, 5 and other endless belts 3, 4, 5, 2. This thread piece 23 is designed to fill up the gaps of the endless belts 2, 3, 4, 5 and the other endless belts 3, 4, 5, 2 as being pressed by the foaming pressure generated at the time of manufacturing the formed piece, thereby preventing the burr from running out through the gaps.

Each thread piece 23 supplied at four corners in the forming passage 6 is supplied by a thread feeding part 24 composing the thread piece feeding device 22, a tension adjusting roller 25 for preventing looseness of the thread piece 23, a thread guide 26 for guiding the thread piece up to the entrance of the forming passage 6, and thread take-up device (not shown). Each constituent element is disposed near the entrance of the forming passage 6 as shown in the drawing.

The diameter of the thread piece 23 is about 0.5 to 2 mm, and kind of thread is desired to be a thick single fiber of nylon or other synthetic fiber, rather than a doubled yarn of fine fibers. This is because the doubled yarn is often poor in sealing performance due to penetration of resin or defomation by foaming pressure. Besides, by using synthetic fiber with smooth parting performance from the urethane resin, the thread can be easily separated from the formed piece by taking up simultaneously when parting the formed piece. Furthermore, the thread with poor parting property may be processed later by chamfering.

As the reinforcing material when manufacturing the slender formed pieces of the invention, organic and inorganic long fibers can be used, and in particular roving of glass fiber is desired. As the foaming resin, foaming urethane resin, polyester resin, phenol resin, urea resin or the like may be used.

The invention is not limited to the fiber reinforced foam resin formed pieces mentioned above alone, and can be also applied in manufacture of similar formed pieces, for example, general resin formed pieces, resin foamed pieces, and inorganic formed pieces. In such cases, by taking up the manufactured formed pieces, it is difficult to rotate and move the endless belts 2, 3, 4, 5, and it is necessary to use a separate apparatus for rotating and moving the endless belts.

What is claimed is:

1. A method for manufacturing a fiber reinforced foam resin formed piece using an apparatus which comprises two rotatable parallel, adjustable horizontal belts each of which are wider than the piece to be formed and two rotatable parallel, adjustable, vertical belts each of which are wider than the resin to be formed, the method comprising forming a passage by adjusting at least one of said two rotatable parallel, adjustable horizontal belts and adjusting at least one of said two rotatable parallel, adjustable, vertically extending belts so that one edge surface of each belt is in contact with one facial surface of one other belt, filling the passage at an inlet end thereof with a reinforcing material impregnated with a foam-curing resin solution, and the foam-curing resin solution is foamed and cured while moving from the inlet end of said passage to an outlet end of said passage as each of said endless belts is rotated relative to each other, thereby manufacturing a slender formed piece in a desired sectional shape.

\* \* \* \* \*